US007930126B2

(12) United States Patent
Frese et al.

(10) Patent No.: US 7,930,126 B2
(45) Date of Patent: Apr. 19, 2011

(54) SAMPLING METHOD FOR AN ASYNCHRONOUS SENSOR AND ASSOCIATED ASYNCHRONOUS SENSOR

(75) Inventors: Volker Frese, Schwieberdingen (DE); Michael Schruellkamp, Bietigheim-Bissingen (DE); Thomas Mayer, Kirchentellinsfurt (AT)

(73) Assignee: Robert Bosch GmbH, Stuttgart (DE)

( * ) Notice: Subject to any disclaimer, the term of this patent is extended or adjusted under 35 U.S.C. 154(b) by 608 days.

(21) Appl. No.: 11/795,723

(22) PCT Filed: Dec. 7, 2005

(86) PCT No.: PCT/EP2005/056572
§ 371 (c)(1),
(2), (4) Date: Apr. 24, 2008

(87) PCT Pub. No.: WO2006/076988
PCT Pub. Date: Jul. 27, 2006

(65) Prior Publication Data
US 2009/0125278 A1    May 14, 2009

(30) Foreign Application Priority Data

Jan. 20, 2005   (DE) .......................... 10 2005 002 721

(51) Int. Cl.
*G01D 18/00* (2006.01)
(52) U.S. Cl. ....................................................... 702/104
(58) Field of Classification Search ................... 702/75, 702/78–80, 83, 90, 93, 104, 141, 176–179, 702/182, 183; 250/208.1
See application file for complete search history.

(56) References Cited

U.S. PATENT DOCUMENTS 6,259,084 B1 *   7/2001   Kochis et al. ............... 250/208.1
2003/0110509 A1 *   6/2003   Levinson et al. ............. 725/121

FOREIGN PATENT DOCUMENTS

| DE | 197 04 132 | 8/1997 |
| DE | 100 54 070 | 5/2002 |
| JP | 10 75441 | 3/1998 |
| JP | 2003-32132 | 1/2003 |

* cited by examiner

*Primary Examiner* — Mohamed Charioui
(74) *Attorney, Agent, or Firm* — Kenyon & Kenyon LLP

(57) ABSTRACT

A sampling method is for an asynchronous sensor, in which sensor data are read out from a sensor element at a sampling rate and written into an output register and subsequently read out from the output register at an output rate. The output rate of the output register is increased by a programmable interpolation of at least two sampling values.

19 Claims, 1 Drawing Sheet

SAMPLING METHOD FOR AN ASYNCHRONOUS SENSOR AND ASSOCIATED ASYNCHRONOUS SENSOR

FIELD OF THE INVENTION

The present invention is directed to a sampling method for an asynchronous sensor and an associated asynchronous sensor.

BACKGROUND INFORMATION

Sensors for detecting and/or measuring physical variables transmit these variables to a central computing and/or control unit. In analog sensors, digitizing is typically performed synchronously by a sampling rate of the analog-digital converter of a central computing and/or control unit predefined by the operating software. Digital sensors perform a digital transmission of the detected and/or measured physical variables. In asynchronous sampling, the sensor data are updated in a different time range than the retrieval of the data from the system via a digital interface. Due to this asynchronous sampling, a temporal fuzziness (jitter) occurs, which reduces the signal quality.

SUMMARY

The sampling method according to an example embodiment of the present invention for an asynchronous sensor and the associated asynchronous sensor may provide the advantage in relation thereto that an output rate of sensor data is elevated and thus the jitter, i.e., the temporal fuzziness, is reduced by a programmable interpolation. The signal quality may be improved by the reduction of the jitter and the performance may thus be increased in regard to reducing the triggering times and improving the accident recognition for passenger protection devices such as airbags, seat belt tensioners, or rollover bars, for example. In particular, complex synchronization of the sensor signals with the system clock of a central analyzing unit may be dispensed with by the triggering method hereof, through which the flexibility in selecting the analyzing concept for the sensor and the technology selection may be increased.

The programmable interpolation may be implemented as linear interpolation. In linear interpolation, for example, a difference of two sampling values is multiplied by the ratio of output rate to sampling rate and the result of the multiplication is added to the old sampling value and stored in an output register. Linear interpolation allows for simple implementation.

To increase the output rate, a required parameter is transmitted via a digital interface from a control unit to the output register during an initialization phase, for example. The required parameter may thus be changed as needed and is available at the beginning of a measurement.

Additionally or alternatively, at least one value for the parameter for increasing the output rate may be stored in a memory in the output register, the value of the parameter being set during the initialization phase by changeover commands which are transmitted from the control unit to the output register via the digital interface, for example. This may allow a simple selection of a predefined value for the required parameter to set the output rate.

Furthermore, it is possible to store at least one parameter for increasing the output rate in the output register as a default setting and load it during an initialization phase. The sampling method starts directly in the "linear interpolation" mode, without transmission of a parameter value or a changeover command. By transmitting a corresponding command, this mode may be shut off or changed as needed, for example, to perform a characterization or an analysis or for applications which do not require linear interpolation.

For safety reasons, the set parameter may be locked against programming during normal operation. Programming or changeover of the parameter between the output rates is thus prevented and the set parameter remains locked until the next initialization phase of the sensor.

An exemplary embodiment of the present invention is illustrated in the drawing and is explained in greater detail in the following description.

DETAILED DESCRIPTION

Figure 2:
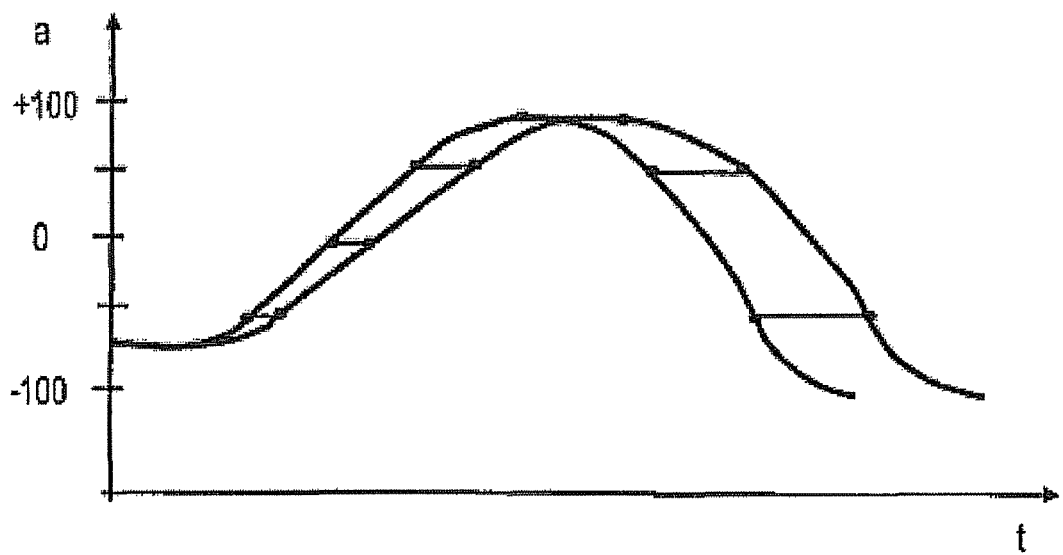
FIG. 2 shows a schematic illustration of temporal fuzziness in asynchronous sensor signal sampling.

In asynchronous sampling, the sensor data are updated in a different time range than from when the data are retrieved from the system via a digital interface. Temporal fuzziness (jitter) arises due to this asynchronous sampling, which may reduce the signal quality and thus the performance in regard to triggering times and crash discrimination as a function of the algorithm used. In conventional digital asynchronous sensors, the updating of the sensor data is set to a fixed value, which typically may not be changed, by an applied clock signal or by an internal clock signal. Removing or reducing the jitter by a complex synchronization of the sensors or by increasing the clock signal frequency is conventional for improving the signal quality. However, limits are set on the improvement by the selected measuring principle and/or by the processing technology and by the hardware construction of the system. In a conventional airbag system, a central acceleration sensor has a sampling rate of 128 μs, for example. A central analyzing unit retrieves the data at a rate of 500 μs, for example. The maximum jitter of the signal data would therefore be 128 μs. A schematic illustration of the jitter, i.e., the temporal fuzziness, in asynchronous sensor signal sampling is shown in FIG. 2.

According to example embodiments of the present invention, an output rate of an output register should be increased by programmable interpolation of at least two sampling values. To implement this, in an initialization phase of the asynchronous sensor, for example, during the system start, a real physical sampling rate of 128 μs, for example, is set, i.e., the data are updated every 128 μs in a digital output register of the sensor. In addition, the sensor is set by a corresponding command or a default value in a mode in which the provision of the sensor signals in the digital output register is increased by interpolation of two or more real sampling values, e.g., to 1 μs or 0.5 μs. Depending on the algorithm used, the performance in regard to triggering times and crash discrimination is thus increased.

Figure 1:
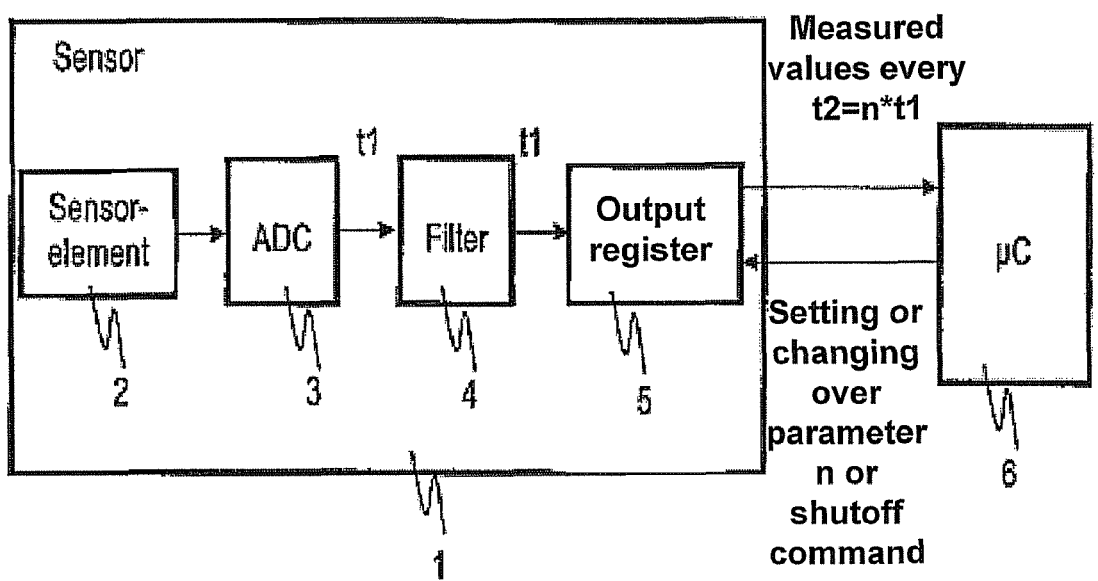
FIG. 1 shows a schematic block diagram of a sensor for a vehicle crash recognition system.

FIG. 1 shows a schematic block diagram of an asynchronous sensor 1 for performing the sampling method according to example embodiments of the present invention for a vehicle crash recognition system. Sensor 1 includes a sensor element 2 for detecting and/or measuring a physical variable, which is output at a sampling rate t1, an analog/digital converter 3, and a digital low-pass filter 4. The digital signal is input into an output register 5 of a digital interface after low-pass filter 4. Output register 5 outputs the sensor data from sensor element 2 at an output rate t2 to a control unit 6. During the initialization phase, control unit 6 transmits a parameter n for the increase of the rate in output register 5 through linear interpolation. The interpolation may be achieved, for example, by dividing the difference between two items of sensor data, which are provided every 128 µs, for example, by the number of points of the interpolation, which is determined by the ratio of sampling rate t1 to output rate t2, e.g., t1/12=128, or multiplying it by the ratio of output rate t2 to sampling rate t1, the ratio of output rate t2 to sampling rate t1 corresponding to parameter n. The result of this calculation is added at the increased rate, e.g., 1 µs or 0.5 µs, to the old sampling value and provided in output register 5.

In an alternative exemplary embodiment, the output register includes a memory, in which at least one value for parameter n for increasing output rate t2 is stored. During the initialization phase, one of the stored values for parameter n is activated by a changeover command transmitted from control unit 6 to output register 5, i.e., a changeover of the output rates may be performed by corresponding commands.

In an additional or alternative exemplary embodiment, at least one parameter n for increasing output rate t2 is stored in the memory of output register 5 as a default setting, parameter n being loaded during the initialization phase. The sampling method thus starts directly in the "linear interpolation" mode, for example. By transmitting a corresponding command, this mode may be changed or shut off as needed, for example, to perform a characterization or an analysis or for applications which do not require linear interpolation.

Sensor 1 shown in FIG. 1 may be locked in normal operation for safety reasons, i.e., programming or changeover of parameter n is no longer possible, so that the set parameter remains locked until the next initialization phase.

Through the sampling method and the associated asynchronous sensor, control units in airbags, for example, may dispense with synchronization of the sensor signals with the system clock of the central analyzing unit, as well as if "jitter sensitive" algorithms are used. The complex implementation of a synchronization thus becomes superfluous and the flexibility in the selection of the analyzing concept for the sensor and the technology selection is increased.

What is claimed is:

1. A computer-implemented sampling method for an asynchronous sensor, comprising:
reading sampling sensor values from a sensor element at a sampling rate;
writing, via circuitry, the sensor values into an output register;
subsequently reading, by a processor, the sensor values from the output register at an output rate; and
programmably interpolating, by the processor, at least two of the sampling values to increase the output rate of the output register;
wherein the programmable interpolation includes a linear interpolation, in which a difference of two sampling values is multiplied by a ratio of the output rate to the sampling rate and a result of the multiplication is added to an old sampling value and stored in the output register.

2. The method according to claim 1, wherein a parameter for increasing the output rate is transmitted from a control unit during an initialization phase.

3. The method according to claim 1, wherein at least one parameter for increasing the output rate is stored in the output register and activated by a changeover command transmitted from a control unit during an initialization phase.

4. The method according to claim 1, wherein at least one parameter for increasing the output rate is stored in the output register as a default setting, which is loaded during an initialization phase.

5. The method according to claim 1, wherein the sensor is locked against at least one of (a) programming and (b) changeover of a parameter during a normal operation.

6. An asynchronous sensor arrangement, comprising:
a sensor element;
a control unit; and
an output register;
wherein the output register is configured to read out sampling sensor values at a sampling rate from the sensor element and to output the sensor values at an output rate to the control unit, the asynchronous sensor arrangement being configured to increase the output rate of the output register by a programmable interpolation of at least two of the sampling values;
wherein the programmable interpolation includes a linear interpolation, in which a difference of two sampling values is multiplied by a ratio of the output rate to the sampling rate and a result of the multiplication is added to an old sampling value and stored in the output register.

7. The sensor according to claim 6, wherein the output register is configured to receive a parameter to increase the output rate of the sensor sampling values to the control unit via a digital interface.

8. The sensor according to claim 6, wherein the output register includes a memory configured to store at least one parameter for increasing the output rate and which is activatable during an initialization phase by a changeover command transmitted from the control unit.

9. The sensor according to claim 6, wherein the output register includes a memory configured to store at least one parameter for increasing the output rate as a default setting, which is activatable during an initialization phase.

10. The asynchronous sensor arrangement according to claim 6, wherein a parameter for increasing the output rate is transmitted from the control unit during an initialization phase.

11. The asynchronous sensor arrangement according to claim 6, wherein at least one parameter for increasing the output rate is stored in the output register as a default setting, which is loaded during an initialization phase.

12. The asynchronous sensor arrangement according to claim 6, wherein a sensor including the sensor element and output register is locked against at least one of (a) programming and (b) changeover of a parameter during a normal operation.

13. The asynchronous sensor arrangement according to claim 6, wherein a sensor includes the sensor element, the output register, and an analog/digital converter.

14. A sensor arrangement, comprising:
a sensor element;
an output register, sampling sensor values being read from the sensor element at a sampling rate and being written into the output register; and
a processor configured to:
read the sensor values from the output register at an output rate; and
programmably interpolate at least two of the sampling values to increase the output rate;
wherein the programmable interpolation includes a linear interpolation, in which a difference of two sampling values is multiplied by a ratio of the output rate to the sampling rate and a result of the multiplication is added to an old sampling value and stored in the output register.

15. The sensor arrangement according to claim 14, wherein a parameter for increasing the output rate is transmitted from the processor during an initialization phase.

16. The sensor arrangement according to claim 14, wherein at least one parameter for increasing the output rate is stored in the output register and activated by a changeover command transmitted from the processor during an initialization phase.

17. The sensor arrangement according to claim 14, wherein at least one parameter for increasing the output rate is stored in the output register as a default setting, which is loaded during an initialization phase.

18. The sensor arrangement according to claim 14, wherein a sensor including the sensor element and output register is locked against at least one of (a) programming and (b) changeover of a parameter during a normal operation.

19. The sensor arrangement according to claim 14, wherein a sensor includes the sensor element, the output register, and an analog/digital converter.

* * * * *